(12) United States Patent
Aotsuka (10) Patent No.: US 7,317,478 B2
(45) Date of Patent: Jan. 8, 2008

(54) SOLID-STATE IMAGING APPARATUS AND DIGITAL CAMERA

(75) Inventor: Yasuo Aotsuka, Miyagi (JP)

(73) Assignee: FUJIFILM Corporation, Tokyo (JP)

( * ) Notice: Subject to any disclaimer, the term of this patent is extended or adjusted under 35 U.S.C. 154(b) by 703 days.

(21) Appl. No.: 10/718,622

(22) Filed: Nov. 24, 2003

(65) Prior Publication Data

US 2004/0105017 A1 Jun. 3, 2004

(30) Foreign Application Priority Data

Dec. 2, 2002 (JP) ............................. 2002-349922

(51) Int. Cl.
*H04N 9/73* (2006.01)
*H04N 5/235* (2006.01)

(52) U.S. Cl. ................................ 348/223.1; 348/229.1

(58) Field of Classification Search ............. 348/223.1, 348/272–280, 224.1–226.1, 370–371
See application file for complete search history.

(56) References Cited

U.S. PATENT DOCUMENTS

| 5,099,313 | A | * | 3/1992 | Suemoto et al. | 348/226.1 |
| 5,198,890 | A | * | 3/1993 | Suga | 348/227.1 |
| 5,808,681 | A | | 9/1998 | Kitajima | |
| 6,952,225 | B1 | * | 10/2005 | Hyodo et al. | 348/223.1 |

FOREIGN PATENT DOCUMENTS

JP 08-340542 A 12/1996

* cited by examiner

*Primary Examiner*—David Ometz
*Assistant Examiner*—Tuan Le
(74) *Attorney, Agent, or Firm*—Birch, Stewart, Kolasch & Birch, LLP (57) ABSTRACT

In a solid-state imaging apparatus provided with a solid-state imaging element having a plurality of pixels for subdividing incident light from a photographic subject into a plurality of color signals so as to image the photographic subject; and signal processing means for performing a white balance correcting operation based upon a gain amount corresponding to a sort of a light source with respect to photographed image data outputted from the solid-state image element; two sorts (G1, G2) of pixels whose spectral sensitivities are different from each other are provided on the solid-state imaging element as the pixel for detecting at least one color among the plurality of color signals; the signal processing means is comprised of: a mixing ratio predicting means 52 operated in such a manner that when there are plural sorts of light sources as to the incident light, a mixing ratio of illumination light emitted from the plural sorts of light sources is predicted every pixel from photographed image data acquired by the pixels having two sorts of the spectral sensitivities; and a gain amount calculating means 53 for calculating a gain amount used to perform the white balance correcting operation every pixel in response to the mixing ratio.

7 Claims, 7 Drawing Sheets

RESPECTIVE COLORS (MACBETH COLOR CHECKER) BEFORE CORRECTION;
CIRCULAR SYMBOLS: CALORIMETRIC POINTS UNDER D65 LIGHT SOURCE;
LOCI OF REPRODUCED COLORS UNDER F6/ (D65 + F6) = 0 TO 1
(WHITE BALANCE IS FITTED TO D65 LIGHT SOURCE)

FIG. 5 (a)

RESPECTIVE COLORS AFTER WHITE BALANCE CORRECTION AND
COLOR DIFFERENCE MATRIX CORRECTION

RESPECTIVE COLORS (MACBETH COLOR CHECKER) BEFORE CORRECTION;
CIRCULAR SYMBOLS: CALORIMETRIC POINTS UNDER D65 LIGHT SOURCE;
LOCI OF REPRODUCED COLORS UNDER F6/ (FLASH LIGHT + F6) = 0 TO 1
(WHITE BALANCE IS FITTED TO FLASH LIGHT SOURCE)

FIG. 7 (a)

RESPECTIVE COLORS AFTER WHITE BALANCE CORRECTION AND
COLOR DIFFERENCE MATRIX CORRECTION

FIG. 7 (b)

SOLID-STATE IMAGING APPARATUS AND DIGITAL CAMERA

This nonprovisional application claims priority under 35 U.S.C. § 119(a) on Patent Application No. 2002-349922 filed in JAPAN on Dec. 2, 2002, the entire contents of which are hereby incorporated by reference.

BACKGROUND OF THE INVENTION

The present invention relates to a solid-state imaging apparatus and a digital camera. More specifically, the present invention is directed to such a solid-state imaging apparatus and a digital camera, capable of acquiring an image having a reduced color fog, while a white balance when a photographic subject is photographed under plural sorts of light sources is corrected under better condition.

In digital cameras such as digital still cameras (containing digital still cameras mounted on portable telephones) and digital video cameras, photographic subjects are photographed by solid-state imaging elements such as CCDs and CMOS image sensors. Then, white balances of acquired image data as to the photographic subjects are corrected in response to sorts of illumination light sources for illuminating the photographic subjects, and then the corrected image data are outputted.

As light sources, various sorts of typically-known light sources have been predicted, e.g., the sunlight (D65 light source, D75 light source etc.), the normal type white color fluorescent light (F6 light source), and flash light. In the case that the digital cameras automatically perform the white balance correcting operations, the digital cameras analyze photographed image data so as to discriminate sorts of light sources from each other, and then use correction values in response to the discriminated sorts of light sources.

However, when a photographing operation is carried out, there are two cases. That is, in one case, a photographic subject is illuminated by employing only a single sort of light source; and in the other case, such a scene that a photographic subject is illuminated by employing plural sorts of light sources is photographed. For instance, there is such a case that an indoor scene is photographed under condition that the sunlight enters through a window into the interior area which is being illuminated by fluorescent light.

Conventionally, in the case that such an image data acquired by photographing a photographic subject is corrected by way of a white balance correcting operation while this photographic subject is illuminated by employing plural sorts of light sources, only one sort of such a light source which constitutes a main light source is judged, and then, an entire image is corrected based upon this judged sort of the light-source. As a result, the following problem occurs. That is, an image portion deviated from the main photographic subject within the image may cause color fogs, in other words, an image of such an image portion which is strongly illuminated by other sorts of light sources may cause the color fogs, so that this image may become, for example, a yellowish image. Therefore, the color reproducibility (especially, reproducibility of flesh color) is lowered.

To solve this problem, for example, the conventional technique described in the paragraph number [0026] of Japanese Laid-open Patent Application No. Hei-8-340542 (patent publication 1) has proposed the following technical ideas. That is, when the major photographic subject is photographed by actuating the electronic flash unit within the room which is being illuminated by the F6 light source, the influence amount of the flash light is calculated every image area of the photographed image based upon both the image data acquired from the solid-state imaging element before the flash light is emitted, and also, the image data acquired from the solid-state image element after the flash light is emitted. Then, the white balance correction amount with respect to each of the image areas is determined in response to this calculated influence amount, and thus, the image in which the white balance as to the entire image area has been controlled can be produced.

[Patent Publication 1]
Japanese Laid-open Patent Application No. Hei-8-340542 (paragraph number [0026])

However, the above-explained conventional technique of the patent publication 1 is directed only to the white balance in the case that the flash light is emitted, and requires such an arrangement that two sheets of such image data must be employed, namely, both the image data acquired before the flash light is emitted and the image data acquired after the flash light is emitted must be employed.

As a result, this conventional technique of the patent publication 1 cannot be applied to a white balance correcting operation in such a case that a photographic subject is photographed which is being illuminated by plural sorts of light sources other than flash light. This reason is given as follows: In the case that an indoor scene is photographed under such a condition that the sunlight is entered through a window of a room while the indoor area is being illuminated by fluorescent light, only one sheet of image data is acquired, but two sheets of such image data cannot be acquired. That is, both image data before the sunlight is illuminated, and image data after the sunlight is illuminated cannot be acquired.

SUMMARY OF THE INVENTION

An object of the present invention is to provide both a solid-state imaging apparatus and a digital camera, capable of performing a white balance correcting operation of an image under better condition which has been photographed under use of arbitrarily-selected plural sorts of light sources, while reducing color fogs and realizing higher color reproducibilities.

To achieve the above-described object, a solid-state imaging apparatus, according to the present invention, is featured by such a solid-state imaging apparatus provided with a solid-state imaging element having a plurality of pixels for subdividing incident light from a photographic subject into a plurality of color signals so as to image the photographic subject; and signal processing means for performing a white balance correcting operation based upon a gain amount corresponding to a sort of a light source with respect to photographed image data outputted from the solid-state image element; in which two sorts of pixels whose spectral sensitivities are different from each other are provided on the solid-state imaging element as the pixel for detecting at least one color among the plurality of color signals; and also, the signal processing means is comprised of: mixing ratio predicting means operated in such a manner that when there are plural sorts of light sources as to the incident light, a mixing ratio of illumination light emitted from the plural sorts of light sources is predicted every pixel from photographed image data acquired by the pixels having two sorts of the spectral sensitivities; and gain amount calculating means for calculating a gain amount used to perform the white balance correcting operation every pixel in response to the mixing ratio.

With employment of this arrangement, even when the photographic subject is being illuminated by employing the plural sorts of light sources, the image data having the superior color reproducibility can be obtained in which the color fog has been suppressed.

The solid-state imaging apparatus of the present invention is featured by that the signal processing means is further comprised of: means for multiplying a color difference signal obtained from the photographed image data by a color difference matrix so as to correct a color tone; and color difference matrix correcting means for correcting a coefficient of the color difference matrix in response to the mixing ratio. With employment of this arrangement, even in such a case that a hue correcting operation of a flesh color is insufficiently performed only by executing a white balance correcting operation, this solid-state imaging apparatus can sufficiently accomplish the hue correcting operation, and thus can improve the color reproducibility of the flesh color.

The solid-state imaging apparatus of the present invention is featured by that the signal processing means is further comprised of: light source sort judging means for judging a sort of light source based upon the photographed image data. With employment of this arrangement, the solid-state imaging apparatus can automatically execute both the white balance correcting operation and the color difference matrix correcting operation in response to the sorts of light sources and also the mixing ratio of these plural light sources.

A digital camera, according to the present invention, is featured by such a digital camera provided with a solid-state imaging element having a plurality of pixels for subdividing incident light from a photographic subject into a plurality of color signals so as to image the photographic subject; and signal processing means for performing a white balance correcting operation based upon a gain amount corresponding to a sort of a light source with respect to photographed image data outputted from the solid-state image element; in which two sorts of pixels whose spectral sensitivities are different from each other are provided on the solid-state imaging element as the pixel for detecting at least one color among the plurality of color signals; and also, the signal processing means is comprised of: mixing ratio predicting means operated in such a manner that when there are plural sorts of light sources as to the incident light, a mixing ratio of illumination light emitted from the plural sorts of light sources is predicted every pixel from photographed image data acquired by the pixels having two sorts of the spectral sensitivities; and gain amount calculating means for calculating a gain amount used to perform the white balance correcting operation every pixel in response to the mixing ratio.

With employment of this arrangement, even when the photographic subject is being illuminated by employing plural sorts of light sources, the digital camera can photograph such an image having a superior color reproducibility, while suppressing color fogs of such one as a yellow fog.

DETAILED DESCRIPTION OF THE PREFERRED EMBODIMENTS

Referring now to drawings, an embodiment of the present invention will be described.

Figure 1:
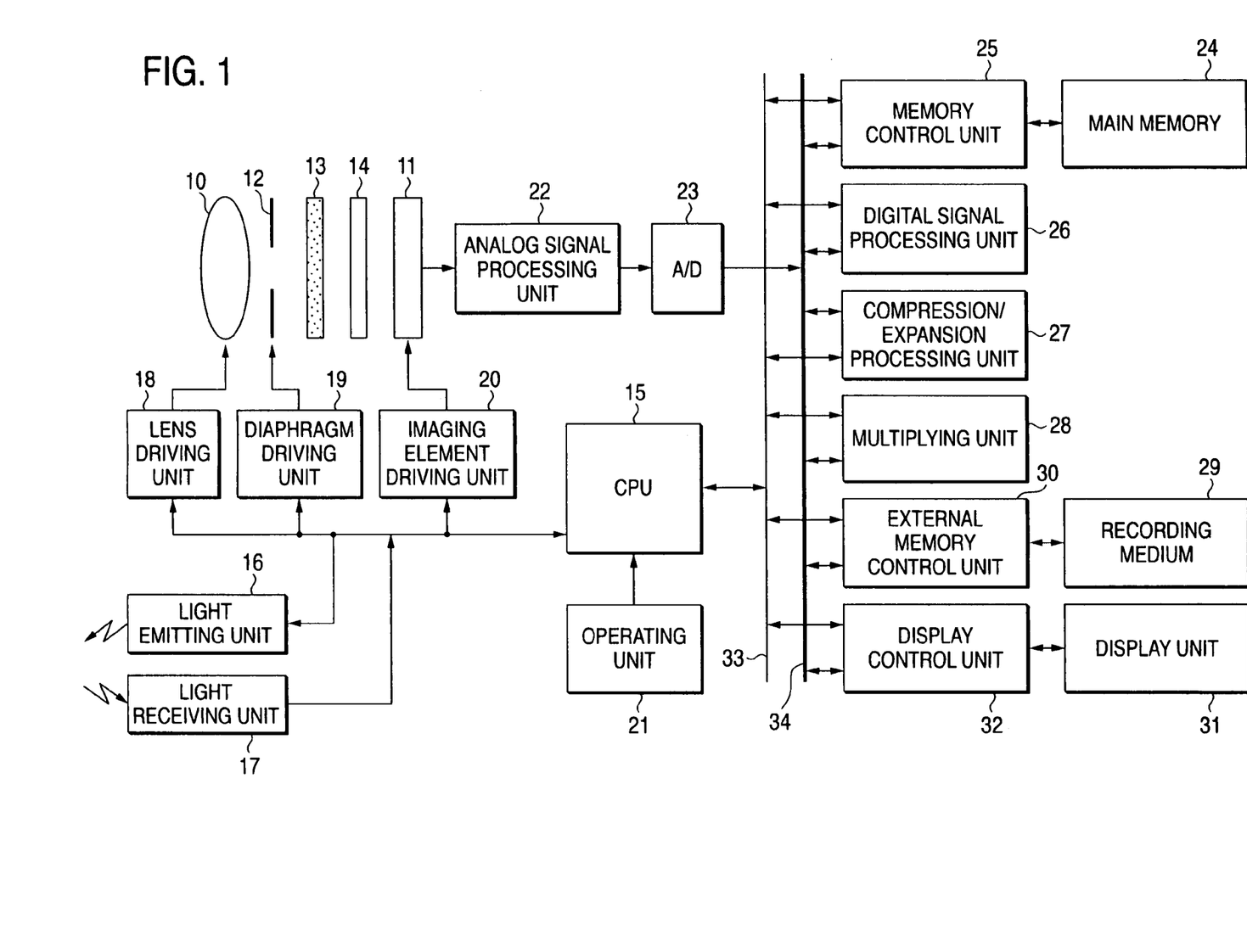
FIG. 1 is a structural diagram of a digital still camera according to an embodiment of the present invention.

FIG. 1 is a structural diagram for showing a digital still camera according to an embodiment of the present invention. This digital still camera is equipped with a photographing lens 10, a solid-state imaging element 11, a diaphragm 12 provided between both the imaging lens 10 and the solid-state imaging element 11, an inferred-ray cutting filter 13 which is preferably combined a ultraviolet-ray cut filter, and an optical low-pass filter 14. A CPU 15 which controls an entire unit of the digital still camera controls both a light emitting unit 16 and a light receiving unit 17 for an electronic flash unit (not shown). Also, the CPU 15 controls a lens driving unit 18 so as to adjust a position of the photographing lens 10 to a focusing position, and controls an aperture amount of the diaphragm 12 via a diaphragm driving unit 19 in order that an exposure amount becomes a proper exposure amount.

Also, the CPU 15 drives the solid-state imaging element 11 via an imaging element driving unit 20 so as to output an image of a photographic subject as a color signal, which has been imaged through the photographing lens 10. Also, while an instruction signal issued by a user is entered via an operating unit 21 into the CPU 15, the CPU 15 performs various sorts of control operations in response to this instruction signal. The solid-state imaging element 11 corresponds to a CCD having a honeycomb pixel arrangement, a bayer type CCD, or a CMOS sensor. In this embodiment, a CCD having a honeycomb pixel arrangement (see FIG. 2) is employed.

An electric control system of the digital still camera is equipped with an analog signal processing unit 22 connected to an output terminal of the solid-state imaging element 11, and an A/D converting circuit 23. The A/D converting circuit 23 converts a color signal outputted from this analog signal processing unit 22 into a digital signal. These analog signal processing unit 22 and the A/D converting circuit 23 are controlled by the CPU 15.

Furthermore, the electric control system of this digital still camera is equipped with a memory control unit 25, a digital signal processing unit 26, a compression/expansion processing unit 27, a multiplying unit 28, an external memory control unit 30, and a display control unit 32. The memory control unit 25 is connected to a main memory 24. A detailed operation of the digital signal processing unit 26 will be explained later. The compression/expansion processing unit 27 compresses a photographed image to obtain a JPEG image, and/or expands a compressed image. The multiplying unit 28 multiplies image data with each other every color signal, which have been outputted from the solid-state imaging element 11 and then have been converted as the digital data, and then outputs the respective multiplied values to the digital signal processing unit 26. A detachably-mounted recording medium 29 is connected to the external memory control unit 30. A liquid crystal display unit 31 mounted on a rear surface, or the like of the digital still camera is connected to the display control unit 32. These structural units are connected to each other via both a control bus 33 and a data bus 34, and are controlled based upon commands issued from the CPU 15.

It should be understood that the digital signal processing unit 26, the analog signal processing unit 22, the A/D converting circuit 23, and the like shown in FIG. 1 may be mounted on the digital still camera as separate circuits. Alternatively, it is better to manufacture these electronic units on the same semiconductor substrate as the solid-state imaging element 11 by employing an LSI manufacturing technique to be formed as a single solid-state imaging apparatus.

Figure 2:
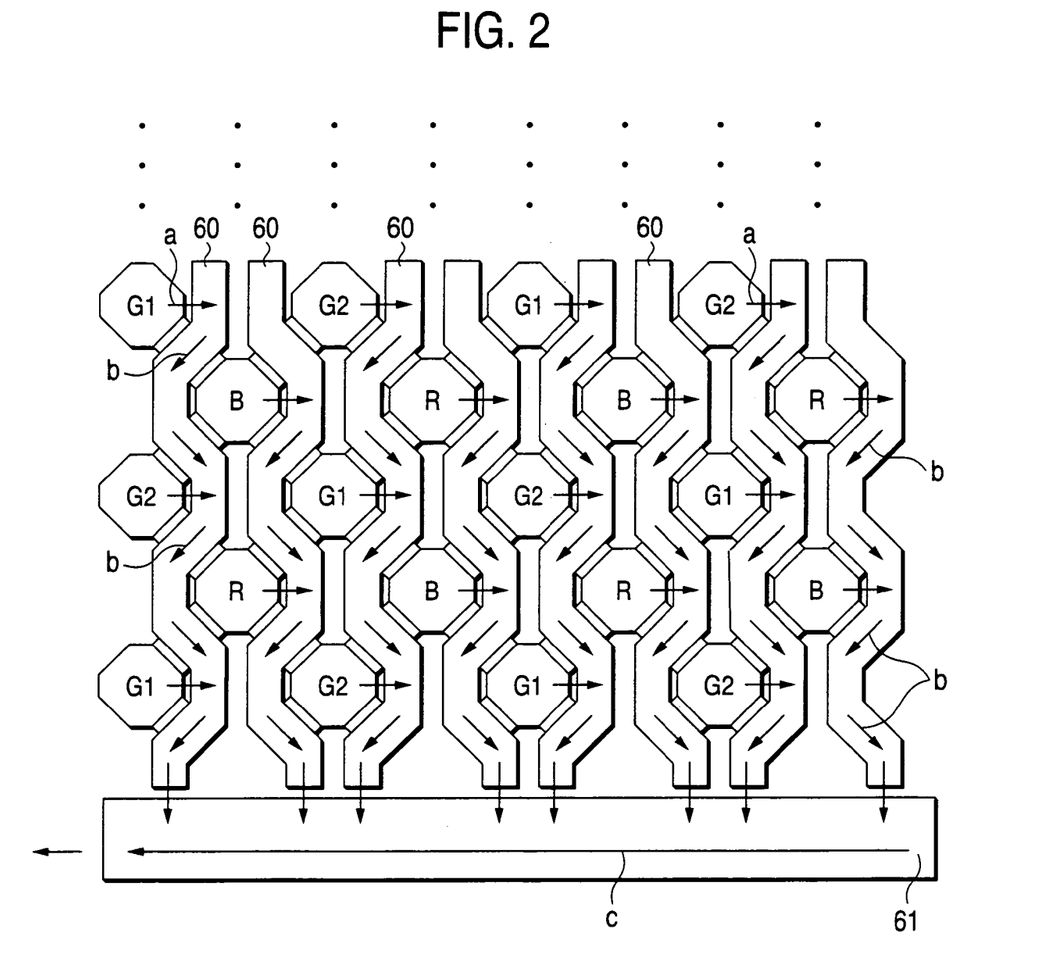
FIG. 2 is a schematic diagram for showing a surface of a solid-state imaging element shown in FIG. 1.

FIG. 2 is a schematic diagram for showing a partial plane of the solid-state imaging element 11 shown in FIG. 1. This solid-state imaging element 11 owns a so-called "honeycomb pixel arrangement." In this honeycomb pixel arrangement, while a large number of photodiodes having green-color filters are arranged in a predetermined interval along longitudinal/transversal directions, photodiodes having blue (B)-color filters and photodiodes having red (R)-color filters are alternately arranged at positions which are positionally shifted by a ½ pitch with respect to the respective photodiodes having the green (G)-color filters of the respective columns and the respective rows.

In this embodiment, as the green-color filters, two sorts (G1 and G2) of green-color filters are prepared, and are alternately arranged. In the example shown in this drawing, octagonal frames written as "R", "G1", "G2", and "B" indicate a red (R)-color filter, green (G1, G2)-color filters and a blue (B)-color filter, respectively. The corresponding photodiodes are arranged on a lower side (namely, lower side of paper plane) of the relevant color filters. Precisely speaking, while an octagonal frame represents a shape of a photodiode, a red-color filter, a green-color filter, and a blue-color filter are provided in larger sizes (for example, octagon or quadrangle) than a size of the octagonal frame.

A signal electron charge which has been stored in each of the photodiodes in such a manner that light passes through each of the color filters to be entered into each of the photodiodes is read to a vertical transfer path 60 in such a manner as indicated by an arrow "a." The vertical transfer path 60 is formed beside each of the photodiodes. This signal electron charge is transferred along the vertical transfer path 60 in such a manner as shown by an arrow "b", and then is reached to a horizontal transfer path 61. Next, this signal electron charge is transferred along the horizontal transfer path 61 in such a manner as indicated by an arrow "c", and then is read out from the solid-state imaging element 11. A signal electron charge amount read out from each of the pixels (photodiodes) may become such a value which responds to a light receiving amount of each of the photodiodes.

Figure 3:
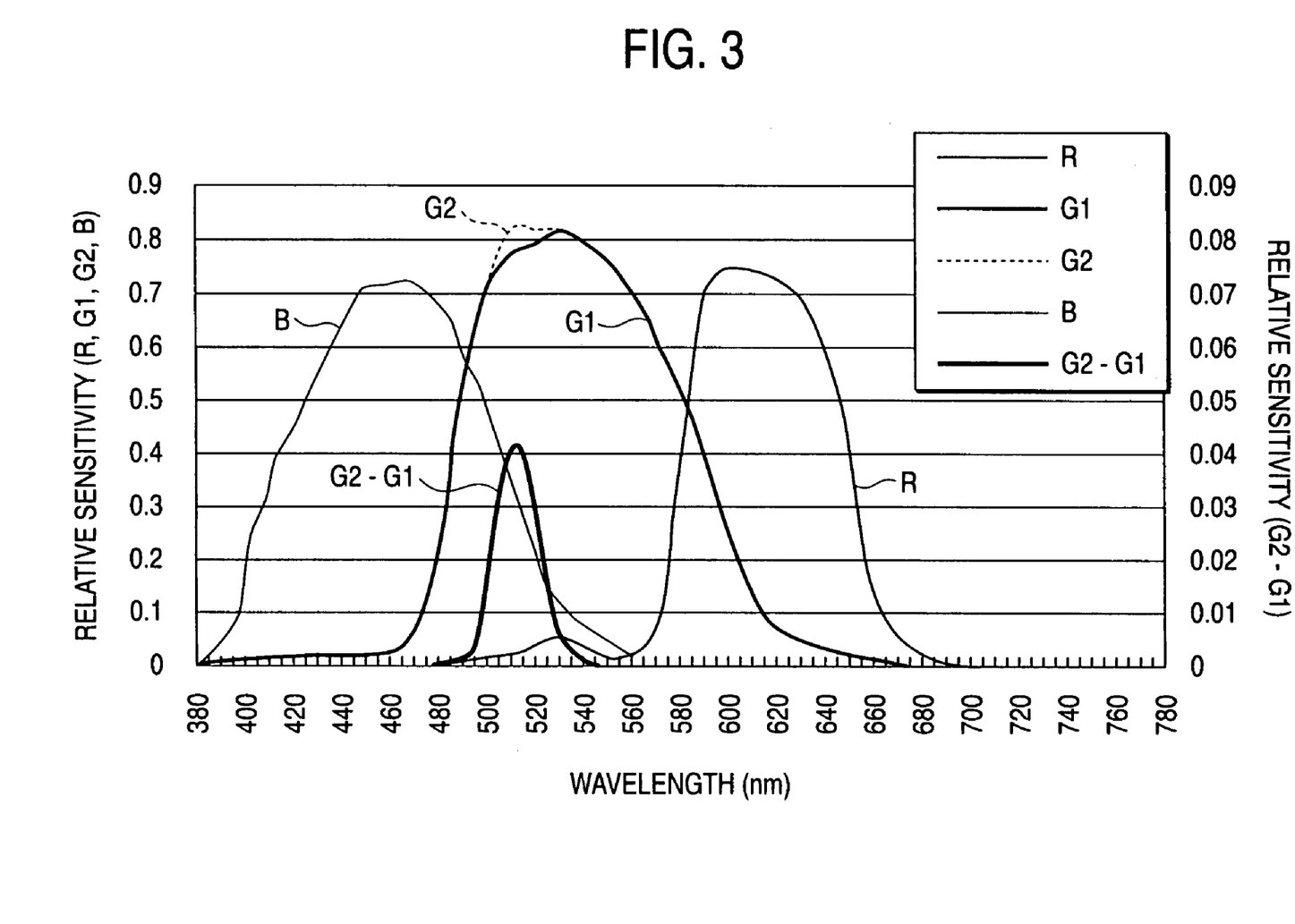
FIG. 3 is a graphic representation for representing spectral sensitivities of the digital still camera shown in FIG. 1.

The color filters are provided on the surfaces of the respective photodiodes of the solid-state imaging element 11 in the above-explained manner. These color filters are manufactured by employing, for example, pigments and dyes. FIG. 3 indicates spectral sensitivities when the respective color filters (R, G1, G2, B) are provided. The spectral sensitivities correspond to such spectral sensitivities after the infrared-ray cut filter 13, the camera lens 10, and the like are combined with each other.

Each of the color filters R, G1, G2, and B may penetrate therethrough light having wavelengths equivalent to the red color, the green color, and the blue color, and may cut such a light having wavelengths other than the above-described wavelengths. For instance, as shown in FIG. 3, the red-color filter R is manufactured in such a manner that this red-color filter R may penetrate therethrough the light having the wavelengths longer than, or equal to approximately 580 nm, and may uniformly cut the light having the wavelength the shorter than about 580 nm, as represented in FIG. 3. The blue-color filter B is manufactured in such a manner that this blue-color filter B owns a peak of the transmitted light in the vicinity of approximately 460 nm, and may cut the light having the wavelengths shorter than, or equal to approximately 400 nm, and also the light having the wavelengths longer than, or equal to about 510 nm, as shown in FIG. 3.

Although a difference between a shape of a spectral characteristic of the green-color filter G1 and a shape of a spectral characteristic of the green-color filter G2 may be large, or small as to two sorts of these green-color filters G1 and G2, these shapes of the spectral characteristics are required not to be completely identical to each other. In this case, the same shapes imply that assuming now that a peak of the spectral sensitivity of the digital still camera is equal to "100", when the waveforms of the spectral characteristics of both the green-color filters G1 and G2 are normalized, these normalized waveforms are completely made coincident with each other.

A basic waveform of the spectral characteristic of the green-color filter G1 of this embodiment is identical to a basic wave form of the spectral characteristic of the green-color filter G2 of the embodiment. These green-color filters G1 and G2 own such waveforms that these filters may cut light having wavelengths shorter than, or equal to approximately 480 nm, and also may cut light having wavelengths longer than, or equal to approximately 600 nm, and further may penetrate therethrough light having wavelengths between approximately 480 nm and approximately 600 nm. The green-color filter G2 may penetrate therethrough the light having the wavelength in the vicinity of about 520 nm at a higher degree than that of the green-color filter G1. FIG. 3 indicates a waveform of "G2-G1" (scale is ordinate on the right side). In this embodiment, while this difference "G2-G1" is utilized, a mixing ratio of plural sorts of light sources may be judged in high precision.

Figure 4:
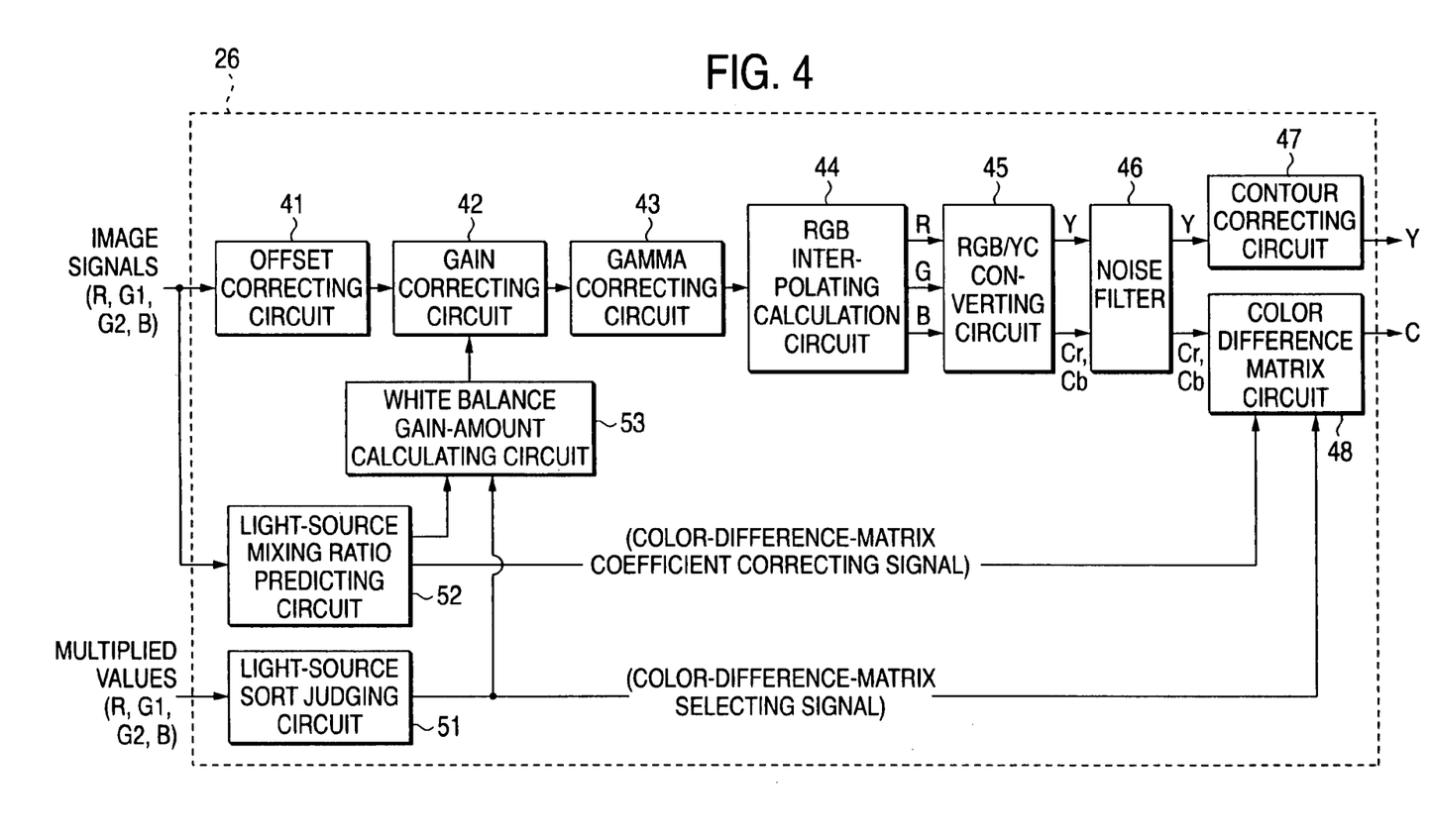
FIG. 4 is a detailed structural diagram of a digital signal processing unit shown in FIG. 1.

FIG. 4 is a detailed structural diagram of the digital signal processing unit 26 shown in FIG. 1. This digital signal processing unit 26 may be arranged by way of a hardware circuit, or a software manner.

The digital signal processing unit 26 exemplified in this drawing is provided with an offset correcting circuit 41, a gain correcting circuit 42, and a gamma correcting circuit 43. The offset correcting circuit 41 acquires the respective colors image signals (R, G1, G2, and B) outputted from the A/D converting circuit 23, and then performs an offset process operation with respect to these color image signals. The gain correcting circuit 42 acquires an output signal of the offset correcting circuit 41, and then performs a white balance adjustment (white balance control) by employing a gain value calculated by a gain amount calculating circuit 53 (will be discussed later). The gamma correcting circuit 43 executes a gamma correction by employing a predetermined "γ" value with respect to a signal outputted from the gain correcting circuit 42.

The color signals outputted from the A/D converting circuit 23 are four color signals R, G1, G2, and B. The offset correcting circuit 41 enters thereinto these four color signals so as to offset-process these four color signals. Next, the gain correcting circuit 42 executes the white balance correcting process operation with respect to each of the acquired color signals R, G1, G2, and B.

The gamma correcting circuit 43 handles both the color signals G1 and G2 among the entered color signals R, G1, G2, and B without any discrimination, and thus, outputs any one of these color signals as the green-color signal "G." Otherwise, the gamma correcting circuit 43 may alternatively linear-couple the green-color signals G1 and G2 in accordance with, for example, the below-mentioned expression 1 so as to obtain the green-color signal G.

$$G = n \cdot Gi + (1-n) \cdot Gj \quad \text{[Expression 1]}$$

where the above-described symbols are defined as follows:

n: constant ($0 < n < 1$);

i, j: these symbols "i", "j" own a value of "1", or "2", and "i≠j";

Gi: direct input signal to the gamma correcting circuit 43;

Gj: signal located at the nearest position as to input signal Gi. Alternatively, since plural sets of signals Gj are present, an average value of all of these signals Gj may be employed. Further, as the expression 1, another expression $G = n \cdot G1 + (1-n) \cdot G2$ may be alternatively employed.

Then, this green-color signal G is combined with other red-color signal R and blue-color signal B to obtain three color (RGB) signals which are processed in a manner similar to that of the prior art. Alternatively, another circuit arrangement may be employed. That is, the green-color signal G may be calculated by employing the above-explained expression 1 at the front stage of the offset correcting circuit 41, the process operation may be continued based upon the three color (RGB) signals.

The digital signal processing unit 26 is further provided with an RGB interpolating calculation unit 44, an RGB/YC converting circuit 45, a noise filter 46, a contour correcting circuit 47, and a color difference matrix circuit 48. The RGB interpolating calculation unit 44 interpolates the RGB color signals outputted from the gamma-correcting circuit 43 so as to acquire 3 color (RGB) signals at the respective pixel positions. The RGB/YC converting circuit 45 acquires a luminance signal "Y", and color difference signals "Cr" and "Cb" after the RGB interpolating calculation operation. The noise filter 40 reduces noise from the luminance signal "Y", and the color difference signals "Cr" and "Cb." The contour correcting circuit 47 performs a contour correcting operation with respect to the luminance signal "Y" after the noise reducing operation. The color difference matrix circuit 48 multiplies a color difference matrix (C-MTX) with respect to the color difference signals "Cr" and "Cb" after the noise reducing operation so as to execute a color tone correcting operation.

In addition, the digital signal processing circuit 26 is equipped with a light-source sort judging circuit 51, a light-source mixing ratio predicting circuit 52, and a white balance gain-amount calculating circuit 53. The light-source sort judging circuit 51 enters thereinto the multiplied value with respect to each of the color signals R, G1, G2, and B, which are outputted from the multiplying unit 28, in order to judge a sort of a light source. The light-source mixing ratio predicting circuit 52 enters thereinto the color signals R, G1, G2, and B so as to predict a light-source mixing ratio.

This white balance gain-amount calculating circuit 53 receives both an output signal of the light-source judging circuit 51 and an output signal of the light-source mixing ratio predicting circuit 52, and then when an illumination light source of a photographic subject corresponds to a single sort of light source, the white balance gain-amount calculating circuit 53 outputs a gain amount of a white balance in response to this single sort of light source to the gain correcting circuit 42, whereas when illumination light sources of a photographic subject correspond to plural sorts of light sources, the white balance gain-amount calculating circuit 53 calculates such a white balance gain amount in response to an illumination light mixing ratio of the respective light-source sorts, and then outputs this calculated white balance gain-amount to the gain correcting circuit 42.

In this embodiment, it is so assumed that white balance gain-amounts when a light source sort "L1" is 100% are K1r, K1g1, K1g2, and K1b (these suffixes r, g1, g2, and b correspond to colors R, G1, G2, and B, respectively, and are similarly applied to the below-mentioned example), whereas white balance gain-amounts when a light source sort "L2" is 100% are K2r, K2g1, K2g2, and K2b. These white balance gain amounts are such values which have been previously set in the memory of the digital still camera.

In such a case that there are plural sorts of light sources, namely both the light source L1 and the light source L2 illuminate the photographic subject in this example, the gain amount calculating circuit 53 calculates gain amounts "Kr", "Kg1", "Kg2", "Kb" every pixel of the white balance gains based upon the below-mentioned expression 2. In this example, it is so assumed that the light-source mixing ratio predicting circuit 52 predicts that the mixing ratio of the light source L1 to the light source L2 every pixel is equal to m:(1−m).

$$1/Kr = m/K1r + (1-m)/K2r$$

$$1/Kg1 = m/K1g1 + (1-m)/K2g1$$

$$1/Kg2 = m/K1g2 + (1-m)/K2g2$$

$$1/Kb = m/K1b + (1-m)/K2b \quad \text{[Expression 2]}$$

It should be noted that $0 \leq m \leq 1$ in this calculation formula.

In the color difference matrix circuit 48, plural sorts of color difference matrixes corresponding to the light sources are provided. This color difference matrix circuit 48 switches a color difference matrix to be used in response to a sort of a light source judged by the light source judging circuit 51, and also, multiplies the color difference signals "Cr" and "Cb" which are entered by the color difference matrix [C-MTX] after this matrix switching operation in such a manner as shown in the following expression 3 so as to output color difference signals "Cr'" and "Cb'", which have been corrected.

$$\text{In the case that } [C-MTX] = \begin{bmatrix} a & b \\ c & d \end{bmatrix} \quad \text{[Expression 3]}$$

$$\begin{bmatrix} Cr' \\ Cb' \end{bmatrix} = [C-MTX] \times \begin{bmatrix} Cr \\ Cb \end{bmatrix}$$

It should be understood that symbols Cr, Cr', Cb, Cb' own values from −128 to +127 (in case of 8 bits).

Furthermore, this color difference matrix circuit 48 receives both an output signal of the light-source sort judging circuit 51 and an output signal of the light-source mixing ratio predicting circuit 52, and when there are plural sorts of light sources, this color difference matrix circuit 48 corrects a coefficient of a color difference matrix in response to an illumination light mixing ratio every sort of the light sources.

Assuming now that while both a coefficient of such a color difference matrix [C1-MTX] when the illumination light of the light source L1 is 100% and another coefficient of such a color difference matrix [C2-MTX] when the illumination light of the light source L2 is 100% are expressed respectively based upon the below-mentioned expression 4, and also, the mixing ratio of the light source L1 to the light source L2 every pixel is given by m: (1−m), $$[C_1 - MTX] = \begin{bmatrix} a_1 & b_1 \\ c_1 & d_1 \end{bmatrix}$$ [Expression 4]

$$[C_2 - MTX] = \begin{bmatrix} a_2 & b_2 \\ c_2 & d_2 \end{bmatrix}$$

coefficients "a", "b", "c", "d" of the color difference matrix used in the color difference matrix circuit 48 maybe calculated in accordance with the below-mentioned expression 5.

$$a = m \cdot a1 + (1 - m) \cdot a2$$ [Expression 5]
$$b = m \cdot b1 + (1 - m) \cdot b2$$
$$c = m \cdot c1 + (1 - m) \cdot c2$$
$$d = m \cdot d1 + (1 - m) \cdot d2$$

It should also be noted that as the color difference matrixes of the light sources L1 and L2, such optimum color difference matrixes may be preferably used. In particular, these color difference matrixes are preferably determined in such a manner that hue of flesh colors becomes better and identical irrespective of the sorts of the light sources. At the same time, these color difference matrixes may be preferably determined by that the reproducibility of the general colors is caused to be approximated to such a condition when a photographing operation is carried out under reference light source.

The light-source sort judging unit 51 detects a sort of a photographing light source in the below-mentioned manner. That is, the light-source sort judging circuit 51 divides one screen photographed by the solid-state imaging element 11 into, for example, 8×8=64 areas, and then calculates values of ΣR, ΣG1, ΣB of signal electron charges in the respective divided areas based upon the signal derived from the multiplying unit 28. Thereafter, the light-source sort judging circuit 51 acquires a set of both data of ΣR/ΣG1 and data of ΣB/ΣG1, and plots 64 sets of these data within a two-dimensional space defined by an R/G1 axis and a B/G1 axis, and finally, detects the sort of photographing light source based upon a shape of this data distribution.

In the case that a shape of a distribution represents such a distribution which bridges both a shape of a distribution caused by a certain sort of light source and another shape of a distribution caused by another sort of light source, the light-source sort judging circuit 51 judges that there are two sorts of light sources, namely may judge sorts of light sources. Also, when the user inputs a sort of a light source from the operating unit 21 shown in FIG. 1, the light-source sort judging circuit 51 uses this entered light-source sort.

It should also be noted that the automatic judging operation as to the sort of the light source is not limited only to the above-explained example, but may be realized by that, for instance, a sensor which is exclusively used to judge a sort of a light source may be provided in an invalid region of the solid-state image element 11. As an example of a spectral sensitivity of this sensor, a spectral sensitivity higher than, or equal to 640 nm, a spectral sensitivity in the vicinity of 580 nm, a spectral sensitivity in the vicinity of 520 nm, and another spectral sensitivity obtained by these spectral sensitivities with each other may become especially effective. Alternatively, a sort of a light source maybe judged based upon four spectral sensitivities of the color signals R, G1, G2q, and B. For example, a spectral sensitivity may be designed in such a manner that a difference between the spectral sensitivities of the color signal G1 and the color signal G2 becomes near 520 nm. Otherwise, the color signal G2 may be designed in such a manner that this color signal G2 owns a sensitivity at 520 nm. In any case, since two sorts of the color signals G1 and G2 are provided as the spectral sensitivity of the green color, the sort of the light source may be judged.

The predicting process operation by the light-source mixing ratio predicting circuit 52 is carried out by employing these four data (R, G1, G2, and B) every pixel. In the case that four spectral sensitivities are arrayed in a mosaic shape on the surface of the solid-state imaging element 11, a mixing ratio is basically predicted by employing the color signals R, G1, G2, and B, which are located at the nearest positions with each other. In addition, the color signals R, G1, G2, and B arranged in an isotropic manner may be possibly employed. As a predicted mixing ratio of a certain pixel, an average value of predicted mixing ratios of peripheral pixels maybe employed. As a result of this averaged predicted mixing ratio, an S/N ratio of the predicted mixing ratio may be improved.

A correction of a white balance gain implies that a gray color is corrected to become gray. Therefore, only in the case that a color of a photographic subject is gray, a prediction formula is established. All of such data which are changed in connection with such a fact that the mixing ratio of respective illumination light emitted from the light source L1 and the light source L2 is changed maybe employed in the prediction formula. For instance, these data are R/G1, G2/G1, (G1−G2)/(G1+G2), B/R, and the like.

These data constitute a "ratio" form of any one of these color signals R, G1, G2, B, or a "ratio" form of linear coupling of these color signals. Since such a white balance gain is corrected, the same white balance corrections are carried out with respect to all of the gray colors defined from the white color to the black color, resulting in a better result.

Furthermore, a mixing ratio predicting operation may be carried based upon a value of a formula obtained by arbitrarily linear-coupling the above-explained "ratios." In particular, assuming now that a light source which constitutes a reference light source is the light source "L1", it is preferable to establish a prediction formula in such a manner that when the light source L1 is 100%, a mixing ratio predicted value at the gray pixel and a mixing ratio predicted value at the flesh color pixel own the same values (namely, it is so assumed that light source L1 is 100%)

However, a prediction formula may be freely established, while this prediction formula is not limited only to the above-explained prediction formula. For example, a prediction formula may be alternatively determined by considering, for instance, the reproducibility as to a leaf green color. Also, for instance, the hue reproducibility of the red color may be such a color hue from which a yellow component is slightly reduced. In any alternative case, when a prediction formula is once determined, the color reproducibility may be determined. This color reproducibility depends upon a mixing ratio of illumination light emitted from the light source L1 to the light source L2.

With respect to a color reproducibility, for instance, even in such a case that a change in flesh colors (namely, change in connection with illumination-light mixing ratio of light source L1 to light source L2) is large and is not favorable, since the above-explained coefficient correction as to the color difference matrix is carried out, the color reproducibility of the flesh color may become stable and better.

If combinations among plural sorts of light sources are different from each other, then mixing ratio prediction formulae may be made as other optimum prediction formulae in accordance with these combinations. Also, corrections of color difference (coefficient calculation formulae) matrixes may be made as optimum coefficient calculation formulae every combination of the light sources having the different sorts. This is obvious that an optimum color difference matrix under 100% of flash light in the case that the flash light is mixed with an F6 light source is different from another optimum color difference matrix under 100% of flash light in the case that the flash light is mixed with an A light source. This reason is given as follows. That is, in the general colors other than a gray color, even when 100% of flash light is illuminated, a predicted value does not always become 100%. As a consequence, since a white balance coefficient may be corrected to be emphasized on the side of a second light source, such a color difference matrix for correcting this misjudgment in an inverse manner becomes an optimum color difference matrix.

Concrete examples will now be explained.

CONCRETE EXAMPLE 1

While a digital still camera was employed into which a CCD had been assembled and in which a spectral sensitivity was made of the color filters R, G1, G2, and B, an image of a photographic subject was photographed to which illumination light of a D65 light source and illumination light of an F6 light source were mixed to be illuminated. Then, image data of this photographed photographic subject was corrected in accordance with the following manners.

The spectral sensitivity of the digital still camera is shown in FIG. 3. As indicated in FIG. 3, a spectral sensitivity of (G2-G1) constitutes a characteristic having a peak in a wavelength of 520 nm. In this example, a sort of a light source is entered in the digital still camera in a manual mode by a user.

While a mixing ratio of each illumination light of the D65 light source to each illumination light of the F6 light source was predicted based upon the below-mentioned expression 6 with respect to each of the pixels, both a white balance and a color difference matrix were corrected every pixel.

$$m(\text{predicted mixing ratio})=2.72x-2.20 \quad \text{[Expression 6]}$$

where "m=1" implies that the D65 light source is 100%; when m>1, it is so assumed that m=1; and when m<0, it is so assumed that m=0.

Also, "x" expressed in the above-described expression 6 is calculated in accordance with the below-mentioned expression 7.

$$x = (G2 - G1)/(0.5 \cdot G2 + 0.5 \cdot G1) + \quad \text{[Expression 7]}$$
$$0.155 \cdot (0.15 \cdot R + 0.5 \cdot G1 + 0.5 \cdot G2)/B$$

It is so assumed that when $(0.5 \cdot G2 + 0.5 \cdot G1) \cdot B=0$, m=1. Also, as the values of R, G1, G2, B, such values were used which were calculated by multiplying the output values of the CCD by the white balance coefficient used for the D65 light source. The green color signal "G" was calculated by assuming that $G=0.5 \cdot G1+0.5 \cdot G2$.

Figure 5:
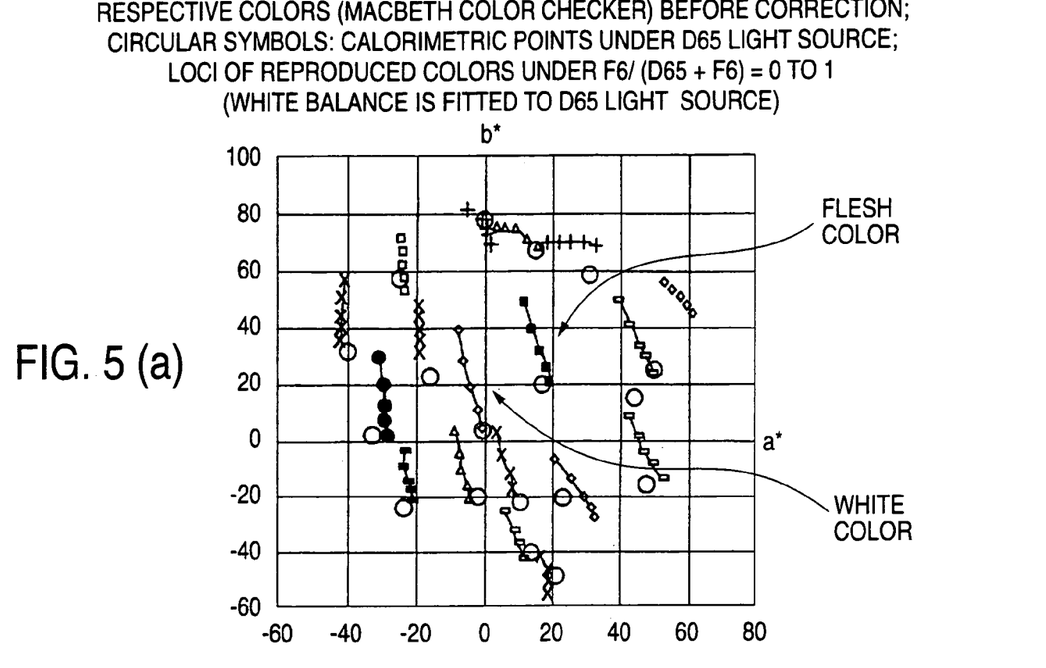
FIGS. 5(a) and 5(b) are diagrams for indicating an effect of a concrete example of the present invention.

FIG. 5 is a diagram for representing an effect of the correcting operations executed in this concrete example 1. FIG. 5(a) indicates a condition before the white balance/color difference matrix correcting operations are carried out, and FIG. 5(b) shows a condition after the white balance/color difference matrix correcting operations have been carried out. The respective circular marks of FIG. 5(a) indicate calorimetric points of the respective colors measured under the D65 light source. In FIG. 5(a), lines elongated in the vicinity of the respective circular marks representing loci of reproduced colors when the illumination light of the F6 light source is gradually mixed with the illumination light of the D65 light source.

With respect to the substantially all of colors, the loci of the reproduced colors is elongated along an upper direction of an ordinate, namely along a b*-direction. This b*-direction indicates a yellow-color direction, and also indicates such a condition that when the illumination light of the F6 light source is mixed with the sunlight (D65 light source), all of these colors are fogged in yellow.

In contrast to the above-explained concrete example, when both the white balance correcting operation and the color difference matrix correcting operation of this concrete example 1 are carried, as shown in FIG. 5(b), more specifically, as to the flesh color and the white color, even if the illumination light of the F6 light source is mixed with the sunlight (D65 light source), the following fact can be revealed. That is, overlaying of the yellow color can be suppressed.

CONCRETE EXAMPLE 2

Figure 6:
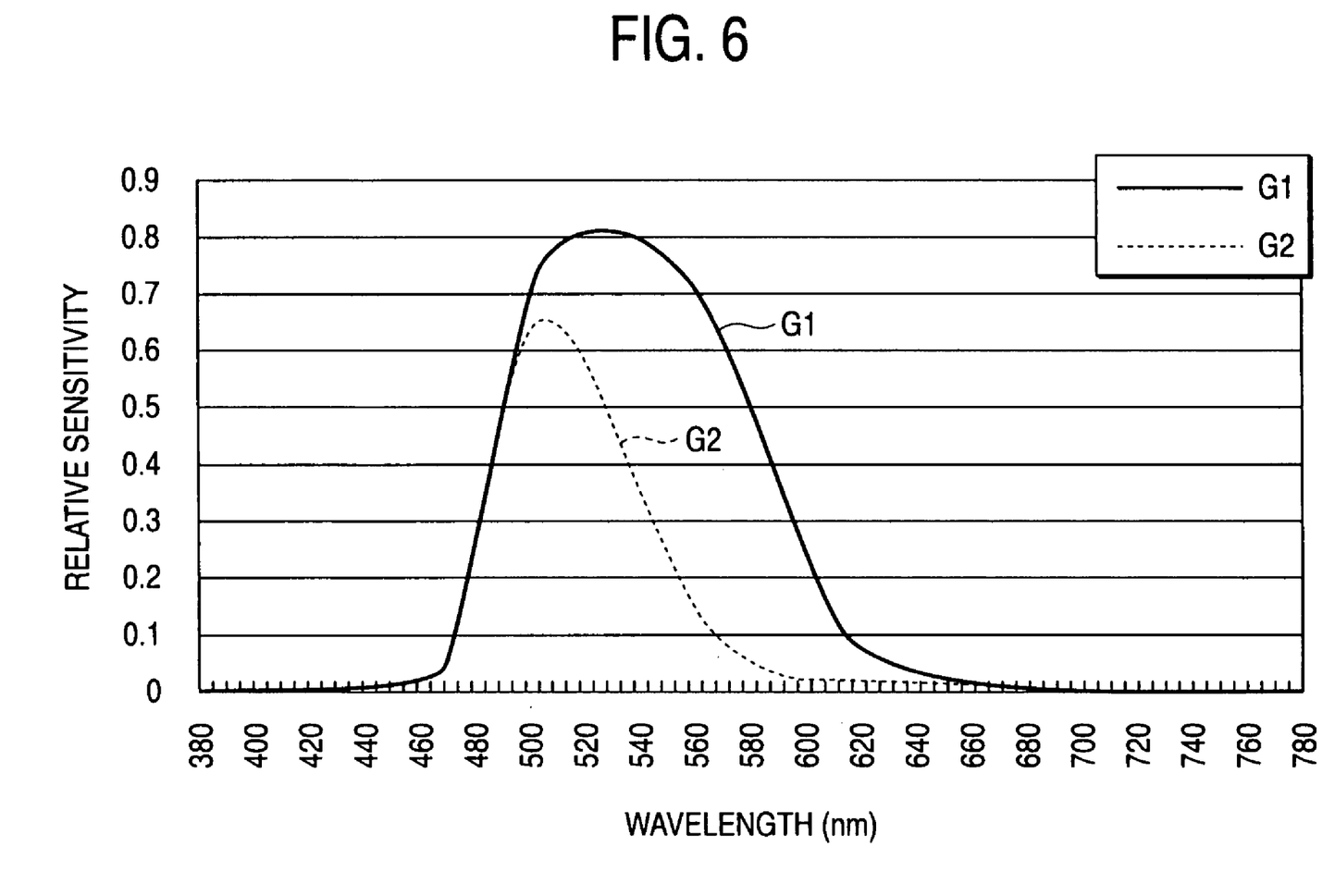
FIG. 6 is a graphic representation for representing spectral sensitivities of the digital still camera in another concrete example of the present invention.

FIG. 6 is a graphic diagram for showing spectral sensitivities G1 and G2 of the digital still camera employed in a concrete example 2. It should be noted that since the spectral sensitivities of the color filters R and B are identical to those of FIG. 3, these spectral sensitivities are omitted in FIG. 6. In this concrete example 2, a photographing operation was carried out within a room illuminated by the F6 light source while an electronic flash unit was operated, and then, photographic image data was corrected in the below-mentioned manner.

First, it was confirmed that the illumination light within the room corresponds to the illumination light of the F6 light source in the pre-exposing operation. This confirmation can be carried out by calculating a light-source sort parameter "P" in accordance with the following expression 8:

$$P=(G2-0.4 \cdot G1+0.05 \cdot R-0.1 \cdot B)/(G1-0.2 \cdot G2+0.4 \cdot B) \quad \text{[Expression 8]}$$

Symbols R, G1, G2, and B expressed in this formula 8 correspond to values which are calculated in such a manner that the photographed image is divided into 64 image sections, and then, all pixel values of each of these 64 image sections are totalized. Also, symbols R, G1, G2, and B at this time correspond to such values by multiplying a white balance gain of an initial stage of the digital still camera (namely, white balance gain used for D55 light source). Since the light-source sort parameter P was calculated every image section, and also, there were a large number of "P" which were entered into a range of such values which had been previously calculated as a parameter used in the F6 light source, the digital still camera automatically judged that the light source was the F6 light source.

Next, a photographic operation was carried out by emitting flash light, and a mixing ratio of two light sources was predicted every pixel of a photographed image. A mixing ratio prediction formula is the below-mentioned expression 9.

$$m(\text{predicted mixing ratio}) = 1.45 - \sqrt{(x/0.215 - 5.82)} \quad \text{[Expression 9]}$$
$$x = G1/G2 + 0.294 \cdot G1/R$$

Note that when x/0.215−5.82<0, it is so assumed m=1; when G2·R=0, it is so assumed m=0; when m>1, it is so assumed m=1; and when m<0, it is so assumed m=0.

As symbols R, G1, G2, and B expressed in the above-described formula 9, values obtained by multiplying a white balance gain used for the flash light are employed. Furthermore, G for forming an image signal was calculated under such a condition of G=0.527·G1+0.473·G2 in order to maximize an S/N ratio.

Figure 7:
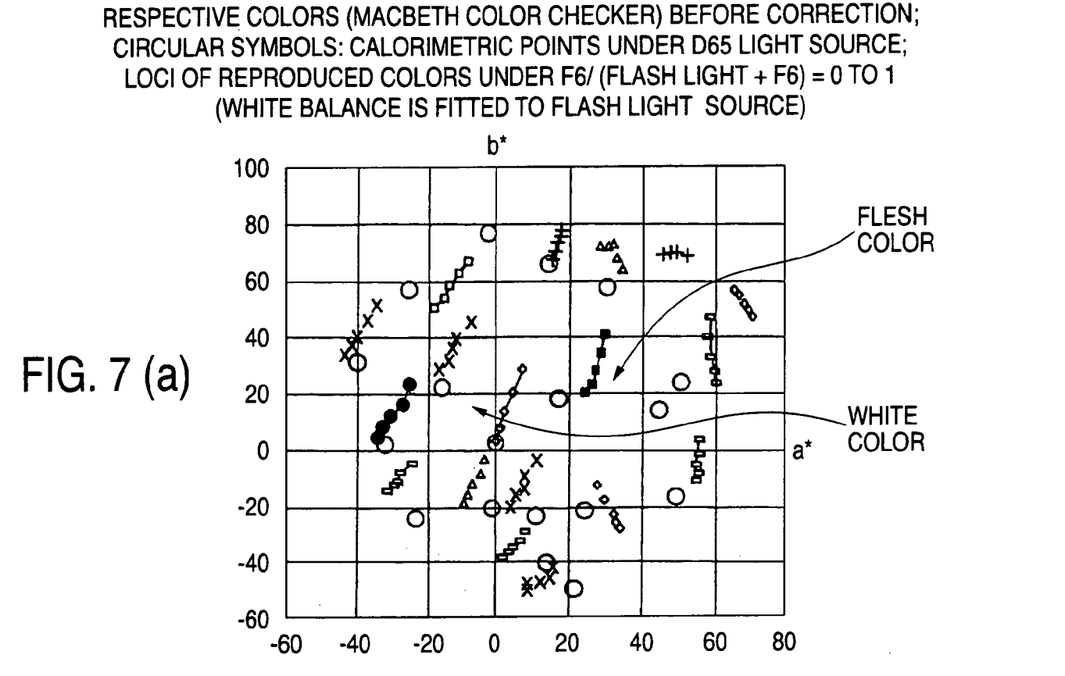
FIGS. 7(a) and 7(b) are diagrams for showing an effect of another concrete example of the present invention.

FIG. 7 is a diagram for representing an effect of the correcting operations executed in this concrete example 2. FIG. 7(a) indicates a condition before the white balance/color difference matrix correcting operations are carried out, and FIG. 7(b) shows a condition after the white balance/color difference matrix correcting operations have been carried out.

The respective circular marks of FIG. 7(a) indicate calorimetric points of the respective colors measured under the D65 light source similar to FIG. 5. Since the flash light is approximated to the light of the D65 light source, the circular symbols may be seen as the colorimetric points of the respective colors under the flash light source. In FIG. 7(a), lines elongated in the vicinity of the respective circular marks represent loci of reproduced colors when the illumination light of the F6 light source is gradually mixed with the illumination light of the flash light source. Also, in this concrete example 2, with respect to the substantially all of colors, the loci of the reproduced colors is elongated along an upper direction of an ordinate, namely along a b*-direction. This b*-direction indicates such a condition that when the illumination light of the F6 light source is mixed with the flash light, all of these colors are fogged in yellow.

In contrast to the above-explained case shown in FIG. 7(a), when both the white balance correcting operation and the color difference matrix correcting operation of this concrete example 2 are carried, as shown in FIG. 7(b), more specifically, as to the flesh color and the white color, even if the illumination light of the F6 light source is mixed with the flash light, the following fact can be revealed. That is, overlaying of the yellow color can be suppressed.

As previously explained, while the pixels for detecting the green color own two sorts of spectral sensitivities "G1" and "G2", the mixing ratio of the illumination light emitted from plural sorts of light sources is calculated, and then, the gain amount of the white balance correcting operation is calculated by considering the contributions of the plural sorts of light sources. As a result, even when the photographic subject is illuminated by the light emitted from the plural sorts of light sources, the white balance correcting operation can be carried out under better condition. Thus, the color reproducibility, especially the reproducibility as to the flesh color can be improved, and the image whose color fog has been suppressed can be photographed.

In the above-described embodiment, two sorts of spectral sensitivities G1 and G2 are provided as to the spectral sensitivity G among the spectral sensitivities R, G, B. Alternatively, instead of "G", even when the spectral sensitivity of R is provided as two sorts of spectral sensitivities of R1 and R2, or even when the spectral sensitivity of B is provided as two sorts of spectral sensitivities of B1 and B2, the mixing ratio of the illumination light may be similarly calculated. In addition, in such a case that solid-state imaging elements of "Ye (yellow)", "Cy (cyan)", "Mg (magenta)", and "G (green)" of the complementary color system instead of R, G, B of the primary color system are mounted, two sorts of spectral sensitivities as to any one of these complementary colors may be provided.

In accordance with the present invention, the white balance correcting operation can be carried out under better condition as to the image which has been photographed while using the plural sorts of light sources which are arbitrarily selected. In addition, the photographed image having the suppressed color fog and the higher color reproducibility can be acquired. As a result, the light emitting power of the electronic flash unit attached to the digital still camera can be maintained at the necessary minimum power. In other words, when the flash light amount is small, the light amount of the available light is relatively increased, so that the color fog may become conspicuous. However, this color fog can be corrected due to the effect of the present invention.

What is claimed is:

1. A solid-state imaging apparatus comprising:

a solid-state imaging element having a plurality of pixels for subdividing incident light from a photographic subject into a plurality of color signals so as to image the photographic subject, the solid-state imaging element including two sorts of pixels whose spectral sensitivities are different from each other, the two sorts of pixels for detecting one color among said plurality of color signals; and signal processing means for performing a white balance correcting operation based upon a gain amount corresponding to a sort of a light source with respect to photographed image data outputted from the solid-state image element, said signal processing means including:

mixing ratio predicting means operated in such a manner that when there are plural sorts of light sources as to the incident light, a mixing ratio of illumination light emitted from said plural sorts of light sources is predicted for every pixel from photographed image data acquired by said two sorts of pixels having said different spectral sensitivities; and gain amount calculating means for calculating a gain amount used to perform the white balance correcting operation for every pixel in response to said mixing ratio.

2. A solid-stage imaging apparatus comprising:

a solid-state imaging element having a plurality of pixels for subdividing incident light from a photographic subject into a plurality of color signals so as to image the photographic subject, the solid-state imaging element including two sorts of pixels whose spectral sensitivities are different from each other, the two sorts of pixels for detecting at least one color among said plurality of color signals; and signal processing means for performing a white balance correcting operation based upon a gain amount corresponding to a sort of a light source with respect to photographed image data outputted from the solid-state image element, said signal processing means including:

mixing ratio predicting means operated in such a manner that when there are plural sorts of light sources as to the incident light, a mixing ratio of illumination light-emitted from said plural sorts of light sources is predicted for every pixel from photographed image data acquired by said two sorts of pixels having said different spectral sensitivities;

gain amount calculating means for calculating a gain amount used to perform the white balance correcting operation for every pixel in response to said mixing ratio;

means for multiplying a color difference signal obtained from said photographed image data by a color difference matrix so as to correct a color tone; and color difference matrix correcting means for correcting a coefficient of said color difference matrix in response to said mixing ratio.

3. The solid-state imaging apparatus as claimed in claim 1, wherein said signal processing means further includes light source sort judging means for judging a sort of light source based upon said photographed image data.

4. The solid-state imaging apparatus as claimed in claim 2, wherein said signal processing means further includes light source sort judging means for judging a sort of light source based upon said photographed image data.

5. A digital camera comprising:

a solid-state imaging element having a plurality of pixels for subdividing incident light from a photographic subject into a plurality of color signals so as to image the photographic subject, the solid-state imaging element including two sorts of pixels whose spectral sensitivities are different from each other, the two sorts of pixels for detecting one color among said plurality of color signals; and signal processing means for performing a white balance correcting operation based upon a gain amount corresponding to a sort of a light source with respect to photographed image data outputted from the solid-state image element, said signal processing means including:

mixing ratio predicting means operated in such a manner that when there are plural sorts of light sources as to the incident light, a mixing ratio of illumination light emitted from said plural sorts of light sources is predicted for every pixel from photographed image data acquired by said two sorts of pixels having said different spectral sensitivities; and gain amount calculating means for calculating a gain amount used to perform the white balance correcting operation for every pixel in response to said mixing ratio.

6. A digital camera comprising:

a solid-state imaging element having a plurality of pixels for subdividing incident light from a photographic subject into a plurality of color signals so as to image the photographic subject, the solid-state imaging element including two sorts of pixels whose spectral sensitivities are different from each other, the two sorts of pixels for detecting at least one color among said plurality of color signals; and signal processing means for performing a white balance correcting operation based upon a gain amount corresponding to a sort of a light source with respect to photographed image data outputted from the solid-state image element, said signal processing means including:

mixing ratio predicting means operated in such a manner that when there are plural sorts of light sources as to the incident light, a mixing ratio of illumination light emitted from said plural sorts of light sources is predicted for every pixel from photographed image data acquired by said two sorts of pixels having said different spectral sensitivities;

gain amount calculating means for calculating a gain amount used to perform the white balance correcting operation for every pixel in response to said mixing ratio;

means for multiplying a color difference signal obtained from said photographed image data by a color difference matrix so as to correct a color tone; and color difference matrix correcting means for correcting a coefficient of said color difference matrix in response to said mixing ratio.

7. The digital camera as claimed in claim 5, wherein said signal processing means further includes light source sort judging means for judging a sort of light source based upon said photographed image data.

* * * * *